Figure 1:
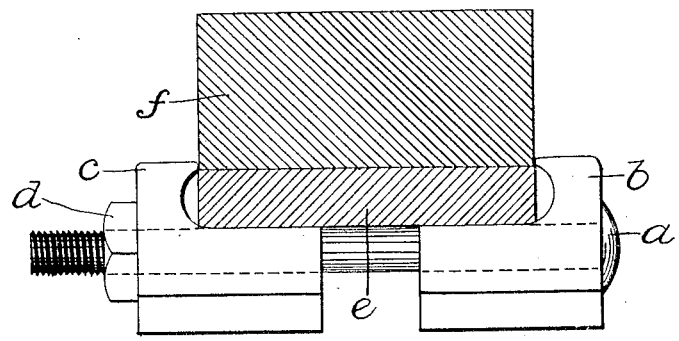

No. 871,868. PATENTED NOV. 26, 1907.
W. GALLOWAY.
TIRE CLEAT FOR TRACTION WHEELS.
APPLICATION FILED FEB. 28, 1907.

WITNESSES:
D. A. Kennedy
O. D. Young

INVENTOR
William Galloway,
BY
G. C. Kennedy.
ATTORNEY

UNITED STATES PATENT OFFICE.

WILLIAM GALLOWAY, OF WATERLOO, IOWA, ASSIGNOR TO WILLIAM GALLOWAY COMPANY, OF WATERLOO, IOWA.

TIRE-CLEAT FOR TRACTION-WHEELS.

No. 871,868.     Specification of Letters Patent.     Patented Nov. 26, 1907.

Application filed February 28, 1907. Serial No. 359,706.

*To all whom it may concern:*

Be it known that I, WILLIAM GALLOWAY, a citizen of the United States of America, and a resident of Waterloo, Blackhawk county, Iowa, have invented certain new and useful Improvements in Traction - Wheel Tire-Cleats, of which the following is a specification.

My invention relates to improvements in traction-wheel tire-cleats, and the object of my improvement is to furnish cleats which can be adjusted to fit over different widths of tires, and which may be applied thereto or removed at will. This object I have accomplished by the means which are hereinafter described and claimed, and which are illustrated in the drawings annexed hereto, in which—

Figure 2:
Figure 3:
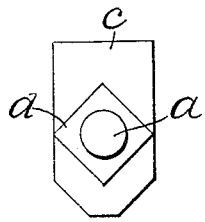

Figure 1 is a side elevation of my adjustable tire-cleat, showing it adjusted to fit over a tire of a certain width, said tire and its felly being depicted in section: Fig. 2 is a plan view of my said device, and Fig. 3 is an end elevation thereof, showing the fastening means.

Similar letters refer to similar parts throughout the several views.

My adjustable tire-cleat is composed of two members $b$ and $c$ of the same form, both perforated longitudinally to admit the bolt $a$. At the upper outer ends of said members are jaws opposed to each other as shown in Fig. 1, to hold the tire $e$ with its felly $f$ securely therebetween. One end of said bolt $a$ is threaded to receive a nut $d$, the latter serving to secure the members $b$ and $c$ at a desired distance apart, but it is obvious that any other desirable fastening means may be used to secure such members, without departing from the principle involved in my invention. The jaws on the members $b$ and $c$ are preferably provided with a concave inner face to permit their inner upper edges to hold the tire $e$ more securely. The lower portion of said members may be beveled off at the edges as shown when desired to secure a better adhesion to slippery surfaces. The devices are attached in any number required to the tires of any heavy wagon or vehicle at will, by simply separating the jaws of the members $b$ and $c$ a sufficient distance, then fitting them over said tires and screwing down upon them the nuts $d$ till firmly fixed in place. Reversing the operation will readily remove them.

Having described my invention, what I claim as new, and desire to secure by Letters Patent, is—

A traction-wheel tire-cleat, comprising the combination with a tire of cleat-members adjustably spaced apart, said cleat-members embracing and overlapping the tire-tread and having inwardly projecting jaws adapted to be secured about the tire's opposite edges, the overlapping portions of said cleat-members having perforations in registration with each other, a bolt adapted to be secured within the said registering perforations and across and over said tire-tread, and means for removably and adjustably spacing said cleat-members apart and securing them about said tire.

Signed at Waterloo, Iowa, this 11th day of Feb. 1907.

WILLIAM GALLOWAY.

Witnesses:
   O. D. YOUNG,
   G. C. KENNEDY.